(12) United States Patent
Shimizu et al.

(10) Patent No.: US 7,536,657 B2
(45) Date of Patent: May 19, 2009

(54) INFORMATION EQUIPMENT REMOTE OPERATING SYSTEM

(75) Inventors: Nobuo Shimizu, Akishima (JP); Mamiko Takahashi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 555 days.

(21) Appl. No.: 11/056,092

(22) Filed: Feb. 14, 2005

(65) Prior Publication Data

US 2005/0235214 A1      Oct. 20, 2005

(30) Foreign Application Priority Data

Apr. 15, 2004   (JP)   ............................. 2004-120706

(51) Int. Cl.
*G06F 3/00*   (2006.01)

(52) U.S. Cl. .................. 715/864; 715/740; 715/751; 715/752; 715/753; 715/754; 715/755; 715/756; 715/758; 715/781; 715/790; 715/792; 715/793; 715/796; 715/797; 715/807; 715/808; 715/866; 709/203; 709/238

(58) Field of Classification Search .................. 715/744, 715/751, 752, 753, 754, 755, 756, 758, 781, 715/790, 792, 793, 797, 796, 807, 808, 864, 715/866; 709/203, 238

See application file for complete search history.

(56) References Cited

U.S. PATENT DOCUMENTS

| | | | | |
|---|---|---|---|---|
| 4,769,636 A | * | 9/1988 | Iwami et al. .................. | 715/790 |
| 5,634,018 A | * | 5/1997 | Tanikoshi et al. ............ | 715/751 |
| 5,677,708 A | * | 10/1997 | Matthews et al. ............ | 345/684 |
| 5,745,711 A | * | 4/1998 | Kitahara et al. .............. | 715/759 |
| 5,900,873 A | * | 5/1999 | Isoda et al. .................. | 715/794 |
| 5,943,679 A | * | 8/1999 | Niles et al. .................. | 715/247 |
| 6,268,855 B1 | * | 7/2001 | Mairs et al. .................. | 715/784 |

(Continued)

FOREIGN PATENT DOCUMENTS

WO   WO 03/102869 A2   12/2003

OTHER PUBLICATIONS

"Software for Realizing Remote Operations of PC from Cellular Phone", http://www-6.ibm.com/jp/domino05/ewm/NewsDB.nsf/ 2002/05271, May 27, 2002.

(Continued)

*Primary Examiner*—Sy D Luu
*Assistant Examiner*—Linh K Pham
(74) *Attorney, Agent, or Firm*—Oblon, Spivak, McClelland, Maier & Neustadt, P.C.

(57) ABSTRACT

An information equipment remote operating system includes an operated-side information equipment and an operating-side information equipment. The operated-side information equipment includes a view region storing unit for storing view information regarding a view region correlated with an window, a screen information processing unit for generating an image to be displayed on an operating-side display unit as an initial state based on the view information, a communication unit, and a control information processing unit for operating an application. The operating-side information equipment includes a communication unit, a view region storing unit for storing the view information, a screen information processing unit for displaying images on multiple display regions in high to low display priority order, and a control information processing unit for transmitting application operating information to the operated-side information equipment.

14 Claims, 12 Drawing Sheets

U.S. PATENT DOCUMENTS

| | | | |
|---|---|---|---|
| 6,411,275 B1 * | 6/2002 | Hedberg | 345/156 |
| 6,915,327 B1 * | 7/2005 | Tuli | 709/203 |
| 6,925,595 B1 * | 8/2005 | Whitledge et al. | 715/234 |
| 7,028,266 B2 * | 4/2006 | Ben-Shachar et al. | 715/790 |
| 7,053,951 B2 * | 5/2006 | Miller et al. | 348/333.05 |
| 7,165,224 B2 * | 1/2007 | Pyhalammi | 715/748 |
| 7,243,130 B2 * | 7/2007 | Horvitz et al. | 709/207 |
| 7,289,111 B2 * | 10/2007 | Asbill | 345/174 |
| 7,289,244 B2 * | 10/2007 | Tuli | 358/1.9 |
| 7,293,243 B1 * | 11/2007 | Ben-Shachar et al. | 715/781 |
| 2001/0009428 A1 * | 7/2001 | Dow et al. | 345/854 |
| 2002/0047916 A1 * | 4/2002 | Miyagi et al. | 348/384.1 |
| 2003/0041106 A1 * | 2/2003 | Tuli | 709/203 |
| 2003/0046421 A1 * | 3/2003 | Horvitz et al. | 709/238 |
| 2003/0077002 A1 * | 4/2003 | Silverstein et al. | 382/282 |
| 2003/0177501 A1 * | 9/2003 | Takahashi et al. | 725/110 |
| 2003/0189599 A1 * | 10/2003 | Ben-Shachar et al. | 345/790 |
| 2003/0224760 A1 * | 12/2003 | Day | 455/412.1 |
| 2004/0085328 A1 * | 5/2004 | Maruyama et al. | 345/619 |
| 2004/0131282 A1 * | 7/2004 | Yoshida et al. | 382/312 |
| 2004/0133848 A1 * | 7/2004 | Hunt et al. | 715/500 |
| 2004/0165010 A1 * | 8/2004 | Robertson et al. | 345/805 |
| 2004/0183824 A1 * | 9/2004 | Benson et al. | 345/719 |
| 2004/0201608 A1 * | 10/2004 | Ma et al. | 345/719 |
| 2004/0268148 A1 * | 12/2004 | Karjala et al. | 713/201 |
| 2006/0111983 A1 * | 5/2006 | Malison | 705/26 |
| 2007/0130274 A1 * | 6/2007 | Lee et al. | 709/206 |

OTHER PUBLICATIONS

"Virtual Network Computing hosted in conjunction with The Laboratory for communications Engineering", http://www.uk.research.att.com/archive/vnc/, Mar. 5, 2005.

Nakasu Masato, "Research of Computer Remote Operating System Using Cellular Phone (VNC system for cellular phone)", http://www.iplab.cs.tsukuba.ac.jp/~baru/research/keitai.html, Mar. 2002.

* cited by examiner

| VIEW REGION | ASSIGNED WINDOW | REGION RANGE | DISPLAY PRIORITY |
|---|---|---|---|
| V1 | WINDOW W1 | (50, 0, 75, 75) | 4 |
| V2 | WINDOW W2 | (5, 0, 75, 75) | 5 |
| V3 | WINDOW W3 | (5, 5, 50, 50) | 1 |
| V4 | WINDOW W3 | (60, 125, 50, 50) | 2 |
| V5 | WINDOW W3 | (0, 0, 200, 200) | 3 |

| VIEW REGION | ASSIGNED WINDOW | REGION RANGE | DISPLAY PRIORITY (1) | DISPLAY PRIORITY (2) | DISPLAY PRIORITY (3) |
|---|---|---|---|---|---|
| V1 | WINDOW W1 | (50, 0, 75, 75) | 3 | 5 | 5 |
| V2 | WINDOW W2 | (5, 0, 75, 75) | 1 | 4 | 4 |
| V3 | WINDOW W3 | (5, 5, 50, 50) | 2 | 1 | 2 |
| V4 | WINDOW W3 | (60, 125, 50, 50) | 4 | 2 | 1 |
| V5 | WINDOW W3 | (0, 0, 200, 200) | 5 | 3 | 3 |

FIG. 9

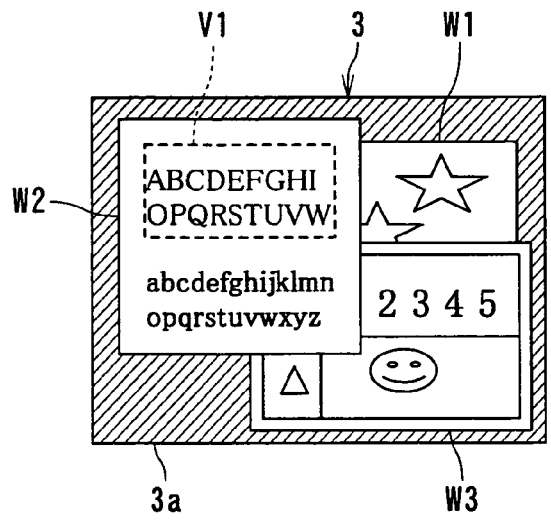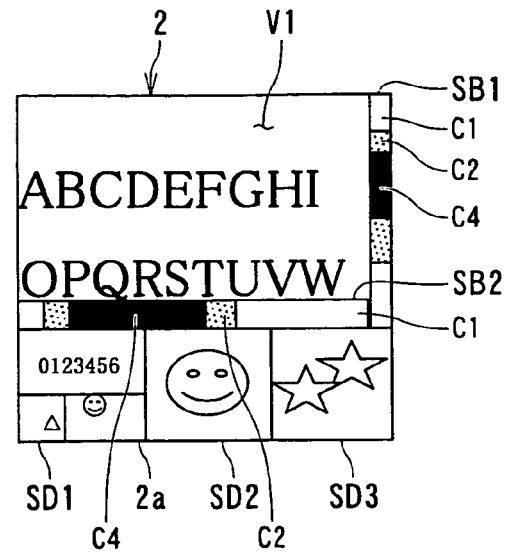
FIG. 13A1　　FIG. 13A2
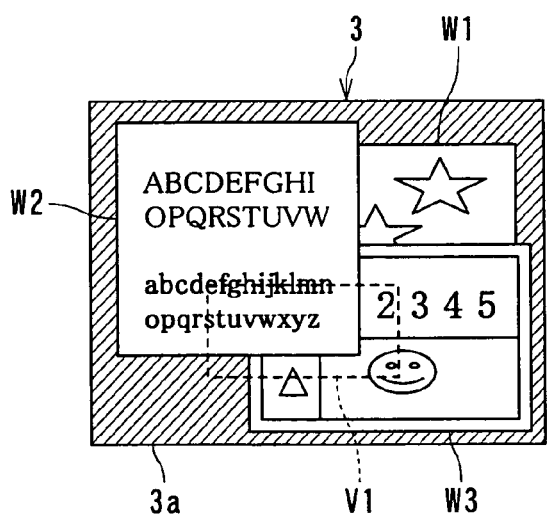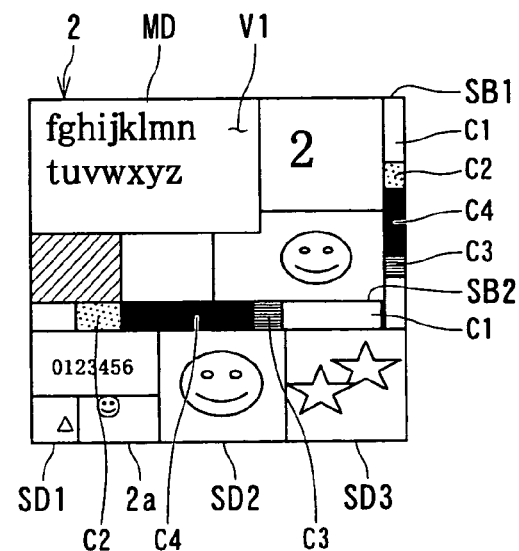
FIG. 13B1　　FIG. 13B2

| SCROLL BAR COLOR | EMPLOYED COLORS |
|---|---|
| COLOR 1 (C1) | WHITE |
| COLOR 2 (C2) | BLUE |
| COLOR 3 (C3) | RED |
| COLOR 4 (C4) | PURPLE |

FIG. 14

| SCROLL BAR COLOR | MEANING OF REGION |
|---|---|
| COLOR 1 (C1) | REGION OUTSIDE ACTIVE WINDOW AND RANGE NOT DISPLAYED ON MAIN DISPLAY REGION MD |
| COLOR 2 (C2) | REGION INSIDE ACTIVE WINDOW BUT NOT RANGE DISPLAYED ON MAIN DISPLAY REGION MD |
| COLOR 3 (C3) | REGION OUTSIDE ACTIVE WINDOW AND ALSO RANGE DISPLAYED ON MAIN DISPLAY REGION MD |
| COLOR 4 (C4) | REGION INSIDE ACTIVE WINDOW AND ALSO RANGE DISPLAYED ON MAIN DISPLAY REGION MD |

FIG. 15

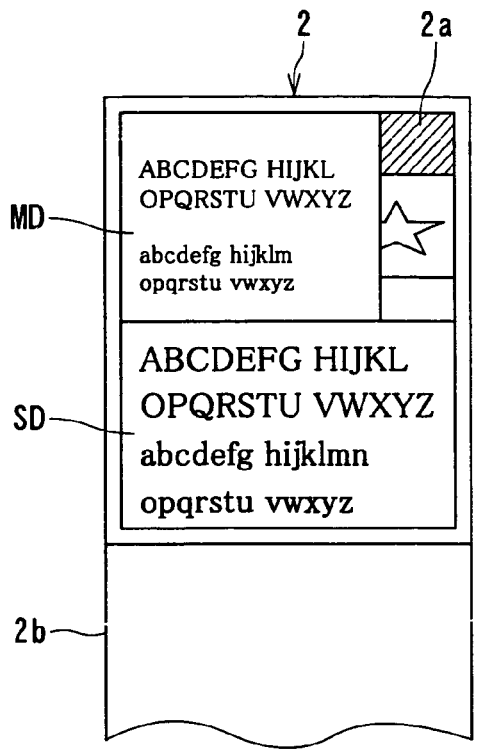
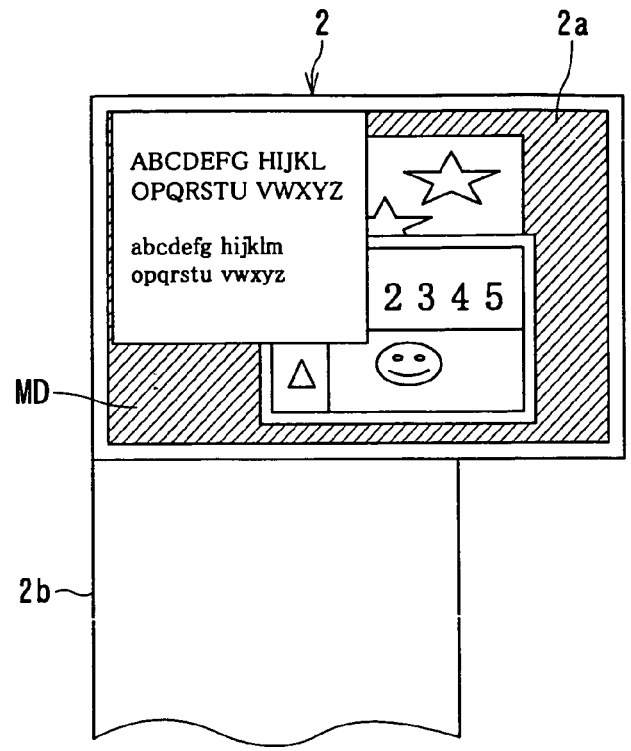

FIG. 16A    FIG. 16B

| BUTTON OPERATION OF CELLULAR PHONE | MODE CHANGE |
|---|---|
| DEPRESS FUNCTION BUTTON FB1 | FUNCTION OF UP/DOWN/LEFT/RIGHT BUTTON IS CHANGED |
| DEPRESS FUNCTION BUTTON FB2 | OPERATING MODE IS SET SO AS TO CHANGE CONTROL MODE TO APPLICATION OPERATING MODE, OR VICE VERSA |
| DEPRESS FUNCTION BUTTON FB2 FOR A LONG PERIOD | BETWEEN VERTICALLY DIVIDED ENTIRE SCREEN MODE AND NORMAL DISPLAY MODE ARE SWITCHED |

FIG. 17

INFORMATION EQUIPMENT REMOTE OPERATING SYSTEM

CROSS REFERENCE TO RELATED APPLICATIONS

The application is based upon and claims the benefit of priority from the prior Japanese Patent Application No. 2004-120706, filed on Apr. 15, 2004, the entire contents of which is incorporated herein by reference.

BACKGROUND OF THE INVENTION

1. Field of the Invention

The present invention relates to an information equipment remote operating system in which information equipment having a display device capable of displaying multiple windows, such as a personal computer at a remote location, is operated through a network using other information equipment.

2. Description of the Related Art

In recent years, small-sized information terminals capable of connecting to a network such as cellular phones capable of connecting to the Internet and PDAs (Personal Digital Assistants) having a wireless LAN (Local Area Network) have become widespread. Further, the resolution of display devices included in these small-sized information terminals has improved, and display of fine images has been enabled. Accordingly, research and development of products for connecting to equipment such as a personal computer at a remote location from a small-sized information terminal via a network, so as to operate the equipment has advanced.

For example, a technique for operating a personal computer (PC), to which software is preinstalled, from a cellular phone and PDA available for use of a Web browser via a network, has been disclosed in "Software for Realizing Remote Operations of PC from Cellular Phone", Japan IBM, [online], press release, [searched on Apr. 12, 2004], Internet <URL: http://www-6.ibm.com/jp/domino05/ewm/News-DB.nsf/2002/05271>, for example.

Further in the same way, a technique for operating a PC, to which software is preinstalled, using a Web browser or dedicated viewer available for use of a specific language has been disclosed in "Virtual Network Cc", ATT, [online], [searched on Apr. 12, 2004], Internet <URL:http://www.uk.research.att.com/archive/vnc/>, for example.

Furthermore, a remote operating system for performing remote operations of a PC from a cellular phone by using a method in which a relay server is provided between the cellular phone and the PC, and communication between the relay server and the cellular phone is performed using the original protocol has been realized, as disclosed in "Research of Computer Remote Operating System Using Cellular Phone", Masato Nakasu, [online], University of Tsukuba, [searched on Apr. 12, 2004], Internet <URL:http://www.iplab.is.tsukuba.ac.jp/~baru/research/keitai.h tml> for example.

However, with a technique for connecting a PC to which software is preinstalled to a cellular phone or PDA via a network and a Web browser, the entire screen is converted into HTML (HyperText Markup Language) and transmitted from information equipment such as a PC or the like serving as an operated device, to information equipment such as a cellular phone, PDA, or the like serving as an operating device, accordingly leading to a problem wherein display is different between the case of operating the operating-side information equipment and the case of operating the operated-side information equipment.

Further, with a technique for operating a PC, to which software is preinstalled, using a Web browser or dedicated viewer available for use of a specific language, the screen of the PC serving as operated-side information equipment can be displayed on operating-side information equipment without any change, but available information equipment serving as operating-side information equipment is restricted to information equipment to be operated on a specific Operating System, and accordingly, cellular phones and some PDAs cannot be used.

Furthermore, with conventional various types of remote operating techniques including a technique for providing a relay server between a cellular phone and a PC and performing communication, even in the event that portability of image information from operating-side information equipment such as a small-sized information terminal or the like to operated-side information equipment such as a PC or the like is performed, only a part of the screen of the operated-side information equipment is displayed on the operating-side information equipment. Accordingly, in the event that the operated-side information equipment is information equipment having a display device capable of displaying multiple windows, screen display in the operating-side information equipment is performed regardless of windows. In the event of referring to another window, instructions to move the display screen vertically and horizontally are necessary at the operating-side information equipment.

In other words, with conventional information equipment, no correlation exists between the display range of the operating-side information equipment and the window on the operated-side information equipment, leading to a problem wherein accompanying movement of a window complicates operations at the operating-side information equipment. In particular, the display region is restricted in the small-sized information equipment, leading to a problem wherein only a part of the window can be referred to at the time of referring to a large window in the operated-side information equipment from the small-sized operating-side information equipment.

In addition to these problems, information equipment such as cellular phones and the like also have a problem wherein an input device normally provided to a PC such as a mouse or the like cannot be used, and a problem wherein the number of buttons or keys is restricted.

In other words, in the event of performing remote operations of information equipment such as a PC or the like using information equipment such as a cellular phone or PDA, having hardware restrictions, and of which the display unit is small as compared with normal information equipment such as a PC or the like, there are various factors which reduce convenience.

SUMMARY OF THE INVENTION

The present invention has been made in light of the aforementioned conventional circumstances, and accordingly, it is an object thereof to provide an information equipment remote operating system in which specific information equipment can be remote-operated from other information equipment, and user convenience is more improved at the time of remote operations.

Further, it is another object of the present invention to provide an information equipment remote operating system in which another operated-side information equipment can be remote-operated via a network using the operating-side information equipment of which the display unit is small as compared with normal information equipment such as a PC or the like, and the screen of the operated-side information equipment can be displayed on the operating-side information equipment in a state wherein user convenience is more improved at the time of remote operations.

To this end, according to a first aspect of the present invention, an information equipment remote operating system comprises an operated-side information equipment for displaying a window on an operated-side display unit and executing an application; and an operating-side information equipment, connecting to the operated-side information equipment via a network, having an operating-side display unit smaller than the operated-side display unit, the operated-side information equipment being provided with: a view region storing unit for storing view information having display priority as parameters at the time of displaying the range of an image, in the case of displaying at least a part of the range of a screen displayed on the operated-side display unit on the operating-side display unit as an initial state, on a relative region range from an arbitrary reference position of an assigned window correlated to a view region correlated to the window and the operating-side display unit; a screen information processing unit for generating an image to be displayed on the operating-side display unit as an initial state in accordance with the view information; a communication unit for transmitting the view information to the operating-side information equipment along with an image generated by this screen information processing unit, and receiving the application operating information from the operating-side information equipment; and a control information processing unit for operating the application by giving the application operating information received by this communication unit to an operating system, and the operating-side information equipment being provided with: a communication unit for receiving the image transmitted from the operated-side information equipment and the view information; a view region storing unit for storing the view information received by this communication unit; a screen information processing unit for displaying at least a part of the region of an image received by the communication unit on multiple display regions included in the operating-side display unit according to the display priority in accordance with the view information stored in the view region storing unit; and a control information processing unit for giving the application operating information input to an operating unit to the communication unit, and controlling the operated-side information equipment to transmit the information.

Further, to this end, according to a second aspect of the present invention, an information equipment remote operating system comprises an operated-side information equipment for displaying a window on an operated-side display unit and executing an application, and an operating-side information equipment connecting to via a network, and having an operating-side display unit smaller than the operated-side display unit, and the operated-side information equipment being provided with: a view region storing unit for storing view information having display priority as parameters at the time of displaying the range of an image, in the case of displaying at least a part of the range of a screen displayed on the operated-side display unit on the operating-side display unit as an initial state, on a relative region range from an arbitrary reference position of an assigned window correlated to a view region correlated to the window and the operating-side display unit; a screen information processing unit for generating an image to be displayed on the operating-side display unit as an initial state in accordance with the view information; a communication unit for transmitting the view information to the operating-side information equipment along with an image generated by this screen information processing unit, and receiving the application operating information from the operating-side information equipment; and a control information processing unit for operating the application by giving the application operating information received by this communication unit to an operating system.

Further, to this end, according to a third aspect of the present invention, an information equipment remote operating system comprises an operated-side information equipment for displaying a window on the operated-side display unit and executing an application, and an operating-side information equipment connecting to the operated-side information equipment via a network, having an operating-side display unit smaller than the operated-side display unit, and the operating-side information equipment being provided with: a communication unit for receiving an image generated and transmitted in the operating-side information equipment in accordance with view information having display priority as parameters at the time of displaying the range of an image, in the case of displaying at least a part of the range of a screen displayed on the operated-side display unit on the operating-side display unit as an initial state, on a relative region range from an arbitrary reference position of an assigned window correlated to a view region correlated to the window and the operating-side display unit, and the view information; a view region storing unit for the view information received by the communication unit; a screen information processing unit for displaying at least a part of the region of an image received by the communication unit on multiple display regions included in the operating-side display unit according to the display priority in accordance with the view information stored in the view region storing unit; and a control information processing unit for giving the application operating information input to an operating unit to the communication unit, and controlling the operated-side information equipment to transmit the information.

With an information equipment remote operating system according to the present invention, specific information equipment can be remote-operated from other information equipment in a state wherein user convenience is more improved via a network.

Further, with an information equipment remote operating system according to the present invention, another operated-side information equipment can be remote-operated via a network using the operating-side information equipment of which the display unit is small as compared with normal information equipment such as a PC or the like, and the screen of the operated-side information equipment can be displayed on the operating-side information equipment in a state wherein user convenience is more improved at the time of remote operations.

BRIEF DESCRIPTION OF THE DRAWINGS

FIG. 9 is a table showing new view information yielded by updating the display priorities of the view information shown in FIG. 4 in the event of change in an active window;

FIGS. 13A1 through 13B2 are diagrams illustrating the display format of a screen in which a scroll bar is displayed on the operating-side display unit of the cellular phone illustrated in FIG. 1;

FIG. 14 is a table showing a color example to be used for coloring of the scroll bar illustrated in FIGS. 13A1 through 13B2;

FIG. 15 is a table showing a setting reference example of colors to be used for coloring of the scroll bar shown in FIG. 14;

FIGS. 16A and 16B are diagrams illustrating an example in which the display format of the operating-side display unit of the cellular phone illustrated in FIG. 1 is switched according to the angle of the operating-side display unit; and FIG. 17 is a table showing an example for assigning a function to the function button in the operating unit of the cellular phone illustrated in FIG. 1.

DESCRIPTION OF THE PREFERRED EMBODIMENTS

Description will be made regarding an embodiment of an information equipment remote operating system according to the present invention with reference to appended drawings. Note that terms indicating directions such as "up, down, left, or right" and the like are used herein in a state illustrated on the drawings.

Figure 1:
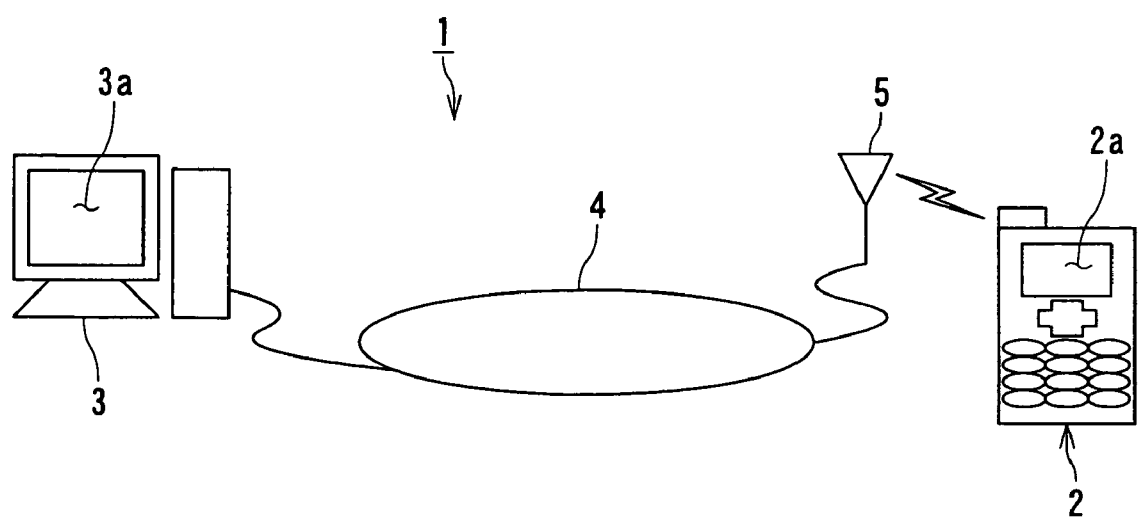
FIG. 1 is a configuration diagram illustrating an embodiment of an information equipment remote operating system according to the present invention.

FIG. 1 is a configuration diagram illustrating an embodiment of an information equipment remote operating system according to the present invention.

An information equipment remote operating system 1 has an arrangement wherein communication between a cellular phone 2 serving as an operating-side information equipment example, and a personal computer (PC) 3 serving as an operated-side information equipment example can be mutually performed via the Internet 4 serving as a network example. In other words, the Internet 4 is connected with a base station 5 for sending/receiving information to/from the cellular phone 2.

The cellular phone 2 includes an operating-side display unit 2a, and the PC 3 includes an operated-side display unit 3a. In general, the operating-side display unit 2a of the cellular phone 2 is smaller than the operated-side display unit 3a of the PC 3, and accordingly, displaying a screen displayed on the operated-side display unit 3a of the PC 3, on the operating-side display unit 2a of the cellular phone 2, without any modification, markedly deteriorates user convenience.

Note that a network according to the present invention is not restricted to the Internet 4; a network such as a LAN or the like may be employed regardless of cable or wireless communication. In addition, the operating-side information equipment may be fixed information equipment as long as the operating-side display unit 2a is a small-sized type and the display unit thereof has mobility such as that of the cellular phone 2 or a PDA. In other words, the operating-side information equipment may be directly connected to the network without using wireless communication as long as the operating-side information equipment can communicate with the operated-side information equipment. In addition, the cellular phone 2 and the PC 3 do not need to be connected to the Internet 4 all the time, so it is sufficient that each can be connected to the Internet 4 at the time of use.

Figure 2:
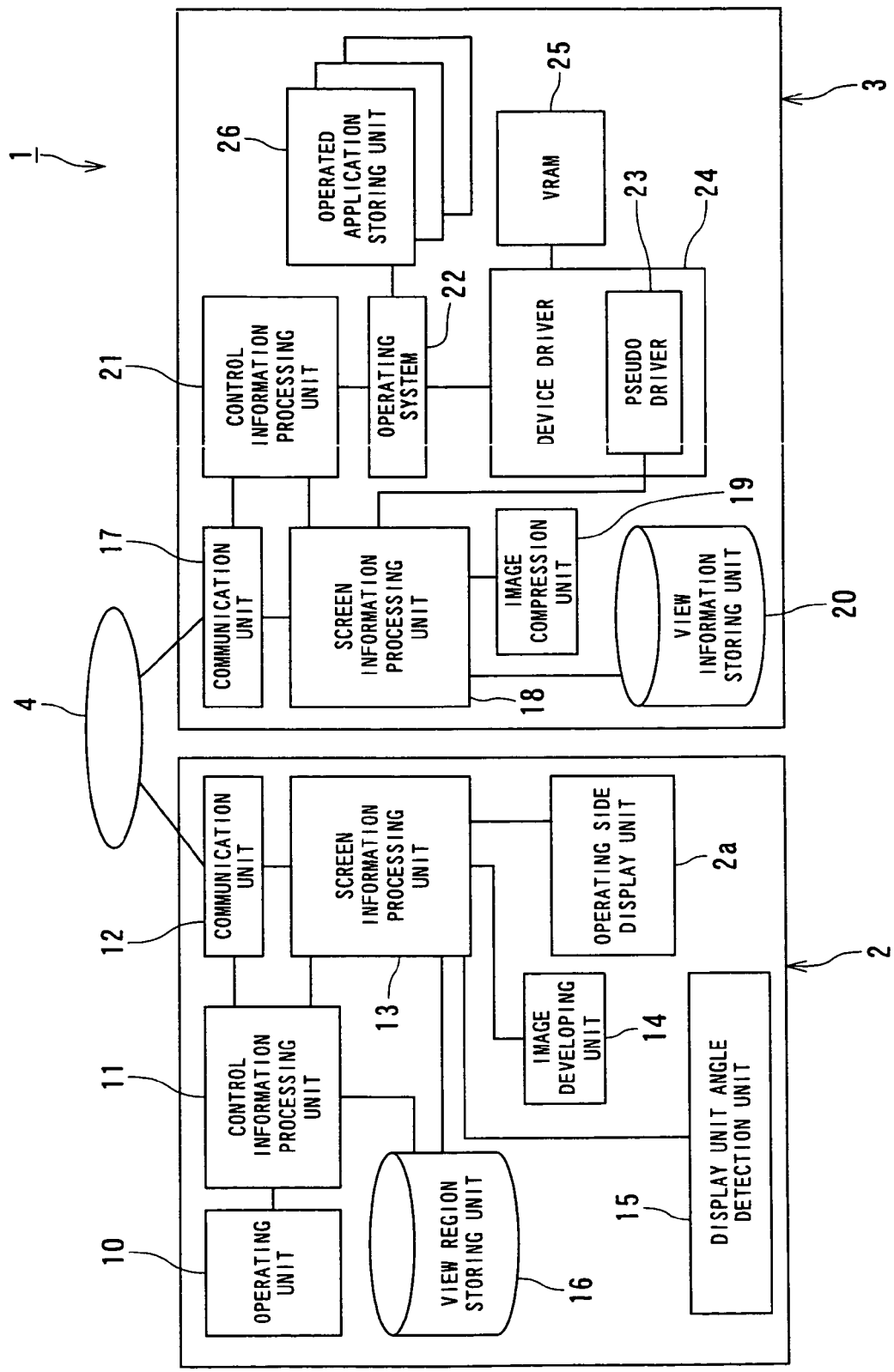
FIG. 2 is a detailed configuration diagram of the information equipment remote operating system illustrated in FIG. 1.

FIG. 2 is a detailed configuration diagram of the information equipment remote operating system 1 illustrated in FIG. 1. The cellular phone 2 includes an operating unit 10, control information processing unit 11, communication unit 12, screen information processing unit 13, operating-side display unit 2a, image developing unit 14, display unit angle detection unit 15, and view region storing unit 16. On the other hand, the PC 3 includes a communication unit 17, screen information processing unit 18, image compression unit 19, view region storing unit 20, control information processing unit 21, Operating System 22, device driver 24 having a pseudo driver 23, VRAM (Video Random Access Memory) 25, and operated application storing unit 26. Note that the base station 5 is omitted in FIG. 2.

The communication unit 17 of the PC 3 has a function for transmitting various types of information received from the screen information processing unit 18 or the control information processing unit 21 to the cellular phone 2 via the network, and a function for providing various types of information received from the cellular phone 2 to the screen information processing unit 18 or the control information processing unit 21.

The view region storing unit 20 of the PC 3 stores information generated for stipulating the range of an image and the relative positions of an image in the case in which the entire or a part of a screen to be displayed on the operated-side display unit 3a of the PC 3 is displayed on the operating-side display unit 2a of the cellular phone 2 as an initial state beforehand. Hereinafter, the screen range of the PC 3 to be displayed on the cellular phone 2 will be referred to as a view region, and the information for stipulating the view region will be referred to as view information.

The VRAM 25 of the PC 3 is memory for recording image information displayed on the operated-side display unit 3a of the PC 3. The screen information processing unit 18 includes a function for acquiring at least a part of the screen information displayed on the operated-side display unit 3a of the PC 3 from the VRAM 25 via the pseudo driver 23 of the device driver 24 based on the view information stored in the view region storing unit 20, a function for compressing image information by providing image information acquired from the VRAM 25 to the image compression unit 19, and a function for transmitting the view information along with the compressed image information to the cellular phone 2 by providing these information to the communication unit 17.

The image compression unit 19 of the PC 3 has a function for compressing image information received from the screen information processing unit 18, and feeding the compressed image information back to the screen information processing unit 18.

The control information processing unit 21 of the PC 3 includes a function for setting the display priority of a window to be operated based on the switching information of a window to be operated, a function for receiving information such as the switching information of a window to be operated, the display priority of a window, and the selection information of a view region to be operated from the cellular phone 2 via the communication unit 17, and switching a window to be operated by providing the received information to the Operating System 22, and a function for providing application operating information received from the cellular phone 2 via the communication unit 17 to the Operating System 22 so as to execute an application operation.

Alternatively, in the event that a window to be operated in the cellular phone 2 does not agree with a window to be operated in the PC 3 based on information such as window switching information received from the cellular phone 2, an arrangement may be made wherein the control information processing unit 21 provides a window switching command to the operating system such that the window to be operated in the PC 3 becomes the window to be operated in the cellular phone 2 as well.

The operated application storing unit 26 of the PC 3 stores various types of application programs to be run on the Operating System of the PC 3, and the application program read therein from the operated application storing unit 26 to the Operating System becomes an object to be operated.

On the other hand, the communication unit 12 of the cellular phone 2 has a function for transmitting various types of information received from the screen information processing unit 13 or the control information processing unit 11 to the PC 3 via the network, and a function for providing various types of information received from the PC 3 to the screen information processing unit 13 or the control information processing unit 11.

The operating unit 10 of the cellular phone 2 has a function for receiving various types of information from a user based on user operations, and providing this information to the control information processing unit 11.

The screen information processing unit 13 of the cellular phone 2 includes a function for providing the compressed image information received from the PC 3 via the communication unit 12 to the image developing unit 14 so as to develop the compressed image information, a function for writing view information received from the PC 3 via the communication unit 12 into the view region storing unit 16, a function for providing the developed image to the operating-side display unit 2a so as to display the image in a predetermined display format based on the view information stored in the view region storing unit 16, and a function for providing the view information stored in the view region storing unit 16 to the communication unit 12 so as to transmit the view information in the case of the view information being updated.

The operating-side display unit 2a has a function for displaying an image received from the screen information processing unit 13. The image developing unit 14 has a function for receiving compressed image information from the screen information processing unit 13, performing development processing, and feeding the developed image information back to the screen information processing unit 13. The view region storing unit 16 stores view information received from the PC 3 via the communication unit 12. The control information processing unit 11 of the cellular phone 2 includes a function for setting the display priority of a window to be operated based on the switching information of the window to be operated received from the operating unit 10, and a function for sending/receiving information such as the switching information of a window to be operated or the display priority of a window to/from the PC 3 via the communication unit 12.

In addition, the control information processing unit 11 includes a function for receiving operating information related to various operations of the cellular phone 2 itself such as a display format change command of the operating-side display unit 2a received from the operating unit 10, and providing the operating information to the screen information processing unit 13, a function for editing the view information stored in the view region storing unit 16, and a function for providing the operating information of an application received from the operating unit 10 to the communication unit 12 so as to transmit the operating information to the PC 3.

The display unit angle detection unit 15 of the cellular phone 2 is provided in the case wherein the operating-side display unit 2a of the cellular phone 2 has a function for changing the direction thereof such as a rotational function, and has a function for detecting that the direction of the operating-side display unit 2a is changed, and providing this effect to the screen information processing unit 13.

Figures 3, 4:
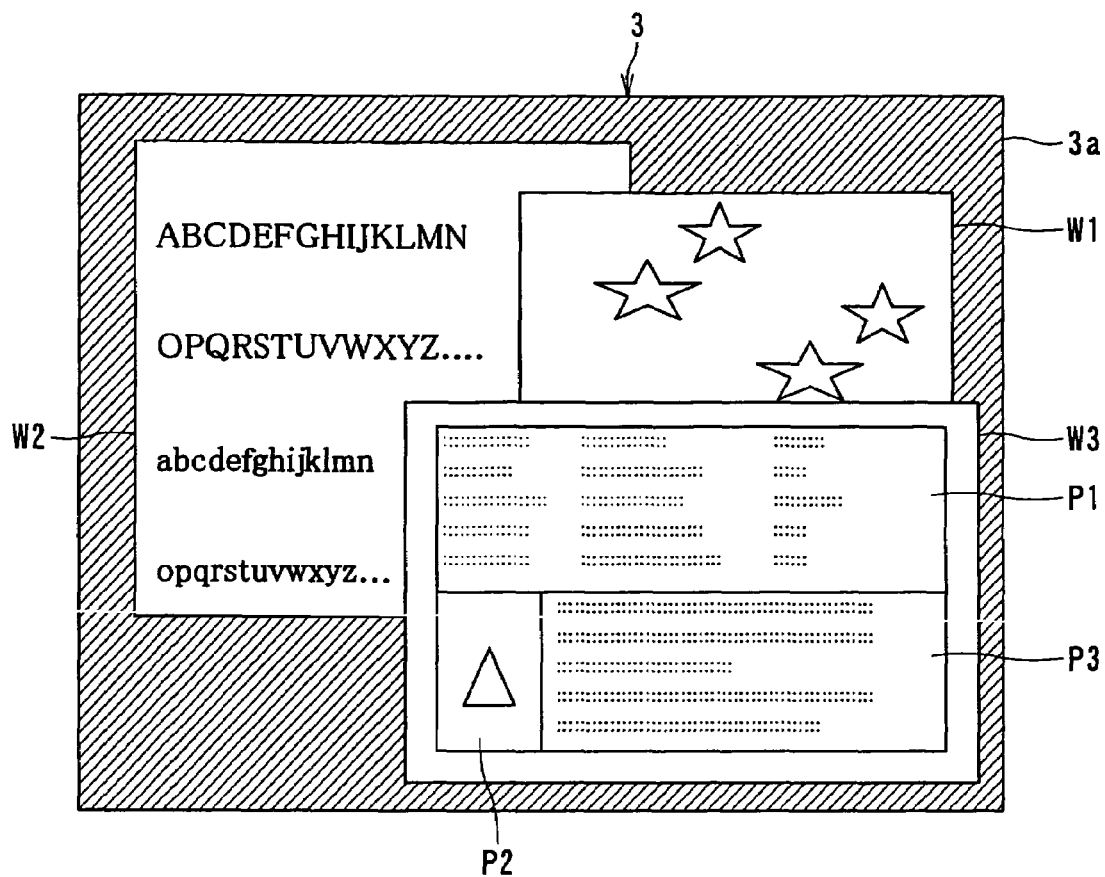
FIG. 3 is a diagram illustrating a screen example to be displayed on an operated-side display unit of the PC illustrated in FIG. 1.
FIG. 4 is a table showing a view information example for stipulating a view region serving as a screen range of the PC to be displayed on an operating-side display unit of the cellular phone illustrated in FIG. 1.

Next, description will be made regarding actions of the information equipment remote operating system 1. First, view information is generated and stored in the view region storing unit 20 of the PC 3 beforehand. FIG. 3 is a diagram illustrating a screen example to be displayed on the operated-side display unit 3a of the PC 3 illustrated in FIG. 1.

As illustrated in FIG. 3, an arbitrary number of windows are displayed on the operated-side display unit 3a of the PC 3. For example, three windows W1, W2, and W3 are displayed, and information such as text, shapes, symbols, and the like, is displayed on each of the windows W1, W2, and W3. A background is displayed on the portions other than the respective windows W1, W2, and W3. Subsequently, various applications AP1, AP2, and AP3 corresponding to the respective windows W1, W2, and W3 are read into the Operating System 22 from the operated application storing unit 26 via the respective windows W1, W2, and W3, and executed, the image displayed on the screen of the operated-side display unit 3a at that time is temporarily stored in the VRAM 25.

The images on the respective windows W1, W2, and W3 are made up of an arbitrary number of panes. For example, an image made up of three panes P1, P2, and P3 is displayed on the window W3. The panes P1 and P3 are, for example, made up of small text information such as e-mail list information or a mail body text, and the pane P2 is, for example, made up of figure information.

As described above, a view region is set as a range to be displayed on the operating-side display unit 2a of the cellular phone 2 of screens to be displayed on the operated-side display unit 3a of the PC 3. This view region is defined by view information having multiple parameters.

Figure 5:
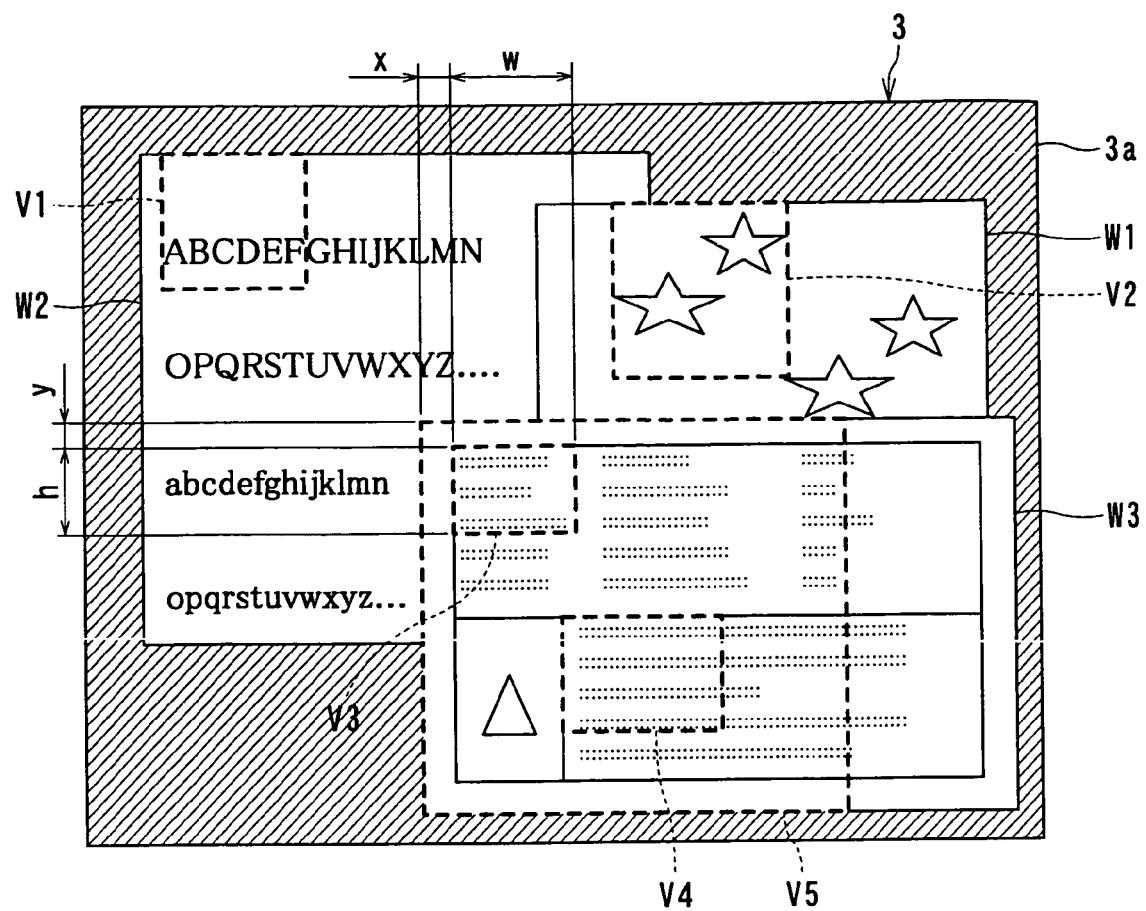
FIG. 5 is a diagram illustrating a view region example stipulated by the view information illustrated in FIG. 4.

FIG. 4 is a table showing a view information example for stipulating a view region serving as a screen range of the PC 3 to be displayed on the operating-side display unit 2a of the cellular phone 2 illustrated in FIG. 1. FIG. 5 is a diagram illustrating a view region example stipulated by the view information shown in FIG. 4.

As shown in FIG. 4, view information is made up of multiple parameters, and a view region is correlated with any one of windows. Accordingly, a view region is correlated with an application. View information has, as parameters, at least the window to be correlated therewith (assigned window), the region range information of a relative view region from an arbitrary reference position correlated with the assigned window, and the display priority at the time of displaying the view region on the operating-side display unit 2a of the cellular phone 2. View information having such each parameter is attached with an identification number as identification information for the sake of convenience.

Of the view information, the region range information of a view region is defined by the required number of sub parameters, for example, four sub parameters (x, y, w, h). The sub parameter x represents an arbitrary reference position correlated with an assigned window, for example, the distance of the PC 3 from the left edge of an assigned window to the left edge of the view region in FIG. 5, and the sub parameter y represents the distance of the PC 3 from the upper edge of the assigned window to the upper edge of the view region respectively. Further, the sub parameters w and h represent the width and height of the view region in FIG. 5 respectively.

However, the reference position to be correlated to an assigned window may be a point, a line, or outside the assigned window. Further, region range information may be defined by an arbitrary coordinates system such as polar coordinates or the like. Furthermore, a view region may be set arbitrarily as long as the view region is included within the range of the operated-side display unit 3a of the PC 3 regardless of inside or outside the assigned window as well as the reference position for stipulating the relative position as to the window of the view region.

In FIG. 5, dashed lines represent view regions stipulated by view information. In examples in FIGS. 4 and 5, five view regions V1, V2, V3, V4, and V5 are defined by view information as to three windows W1, W2, and W3, and an identification number is assigned thereto. As can be understood from FIG. 4, the assigned window of the view region V1 is the window W1, the region range of the view region V1 has the left edge positioned at 50 (in arbitrary relative units) from the left edge of the window V1, the top positioned at 0 from the upper edge of the window V1, with a width of 75 and a height of 75. Furthermore, the display priority of the view region V1 is the 4th in priority.

Further, the view regions of which the assigned window is the window W3 are the three view regions V3, V4, and V5. The display range of the respective view regions V3, V4, and V5 are (x, y, w, h)=(5, 5, 50, 50), (60, 125, 50, 50), (0, 0, 200, 200) respectively, and the display priorities of the respective view regions are 1st, 2nd, and 3rd respectively. Accordingly, the view region V3 belonging to the window W3 is displayed in the foreground in FIG. 5.

As described above, the multiple view regions V3, V4, and V5 may be defined as to the single window W3. At this time, the common window W3 is taken as the assigned window, so the display priorities of the view regions V3, V4, and V5 are set to 1st, 2nd, and 3rd so as to be arrayed consecutively.

In other words, a view region is correlated with a window or application based on view information, and defined as the display region corresponding to the application. View information is stored in the view region storing unit 20. Generation and saving of this view information allows remote operations of the PC 3 which improve user convenience to be performed from the cellular phone 2.

Figure 6:
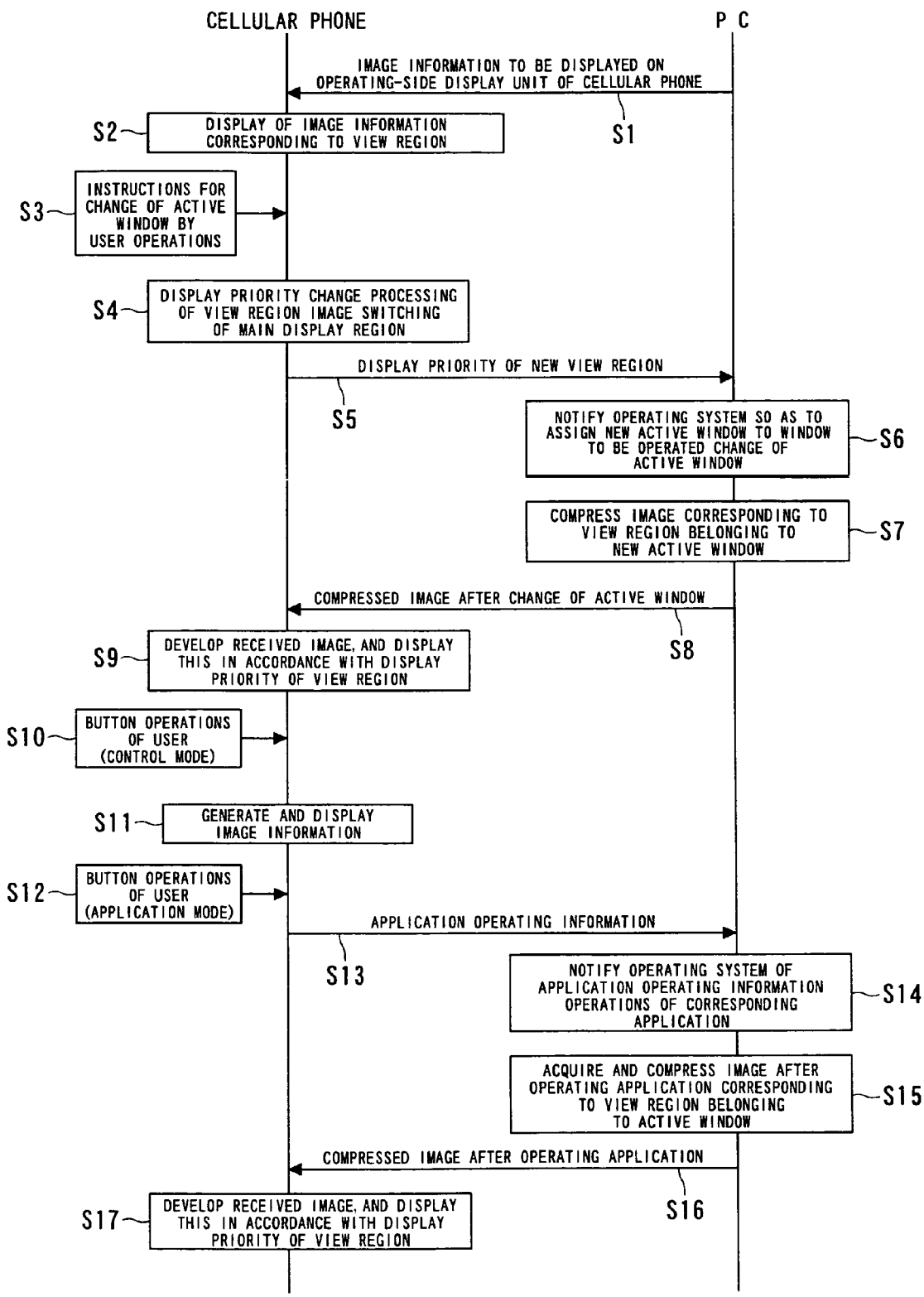
FIG. 6 is a sequence diagram illustrating the flow at the time of operating the PC from a cellular phone via a network with the information equipment remote operating system illustrated in FIG. 1.

FIG. 6 is a sequence diagram illustrating the flow at the time of operating the PC 3 from the cellular phone 2 via the network based on the information equipment remote operating system 1 illustrated in FIG. 1.

First, in S1, image information to be displayed on the operating-side display unit 2a of the cellular phone 2 is transmitted to the cellular phone 2 from the PC 3 along with view information stored in the view region storing unit 20 based on this view information. This transmitting timing of the image information from the PC 3 to the cellular phone 2 may be automatically transmitted at the time of the PC 3 being booted or at the time of the PC 3 receiving a request to transmit the image information from the cellular phone 2.

More specifically, first, the screen information processing unit 18 acquires image information to be displayed on the operated-side display unit 3a of the PC 3 from the VRAM 25 via the pseudo driver 23. In addition, the screen information processing unit 18 provides the acquired image information to the image compression unit 19, and the image information compressed at the image compression unit 19 is fed back to the screen information processing unit 18.

Next, the screen information processing unit 18 provides the view information read therein from the view region storing unit 20 to the communication unit 17 as well as the compressed image information, and the communication unit 17 transmits the compressed image information and the view information to the cellular phone 2 via the network.

Consequently, the communication unit 12 of the cellular phone 2 receives the compressed image information and view information. The compressed image information is provided to the screen information processing unit 13 of the cellular phone 2. The screen information processing unit 13 provides the compressed image information to the screen developing unit 14, and the screen developing unit 14 develops the compressed image information, and feeds the developed image information back to the screen information processing unit 13. On the other hand, the view information is written into the view region storing unit 16 via the screen information processing unit 13 and stored.

Subsequently, in S2, the screen information processing unit 13 generates image information corresponding to each view region with reference to the view information read therein from the view region storing unit 16, and provides the generated image information to the operating-side display unit 2a so as to display this information.

Accordingly, the image information to be transmitted from the PC 3 to the cellular phone 2 includes at least the image information corresponding to the view region to be displayed on the display unit of the cellular phone 2, and includes the image information of the view regions having a low display priority and not displayed or the image information outside the view region as necessary. Conversely, the entire image information to be displayed on the operated-side display unit 3a of the PC 3 may be taken as the image information to be transmitted from the PC 3 to the cellular phone 2.

Figure 7:
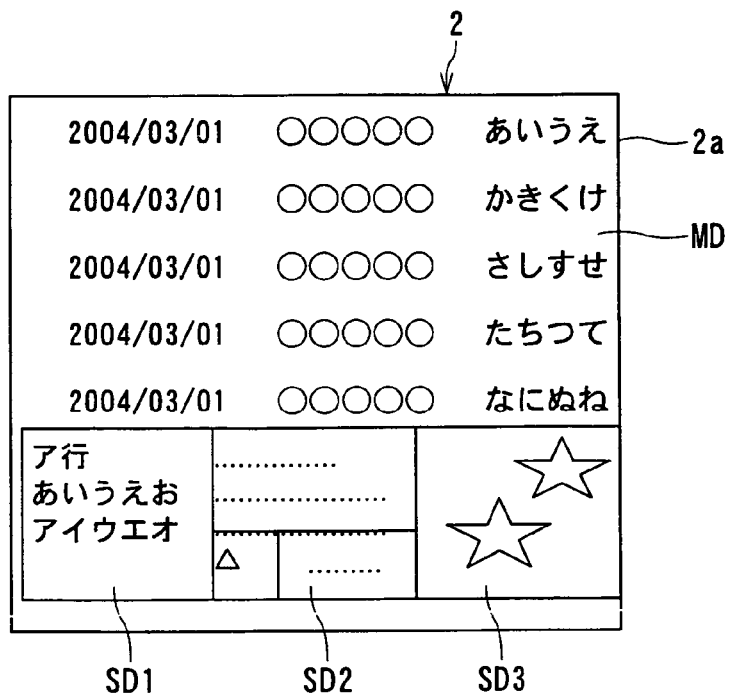
FIG. 7 is a screen example to be displayed on the operating-side display unit of the cellular phone illustrated in FIG. 1.

FIG. 7 is a screen example to be displayed on the operating-side display unit 2a of the cellular phone 2 illustrated in FIG. 1. The operating-side display unit 2a includes multiple display regions. For example, the operating-side display unit 2a includes one main display region MD and three sub display regions SD1, SD2, and SD3. On the main display region MD and the sub display regions SD1, SD2, and SD3, a part of the screen displayed on the operated-side display unit 3a, i.e., a part of the view region defined in the view information is displayed.

The contents to be displayed on the main display region MD and sub display regions SD1, SD2, and SD3 are determined by the display priorities defined as the parameters of the view information. For example, while the image of the view region of which the display priority is determined as the 1st priority is displayed on the main display region MD, the images of the view regions of which the priorities are determined as the 2nd, 3rd, and 4th priorities are displayed on the sub display regions SD1, SD2, and SD3.

FIG. 7 is an example in which a part of the operated-side display unit 3a is displayed on the operating-side display unit 2*a* in accordance with the view information defined in FIGS. 4 and 5. For example, a part of the view region V3 of which the display priority is 1st in priority is displayed on the main display region MD.

In the same way, a part of the view region V4, a part of the view region V5, and a part of the view region V2 are displayed on the sub display regions SD1, SD2, and SD3 respectively in accordance with each display priority. The view region V1 is 5th in display priority, and accordingly, is not displayed on the operating-side display unit 2*a* of the cellular phone 2. Note that the aforementioned display regions (main display region MD and sub display regions SD1, SD2, and SD3) are set on the cellular phone 2 side beforehand, and are fixed regions unlike windows. Alternatively, such a view region may be taken as the entire screen of the operated-side display unit 3*a* of the PC 3.

Figure 8:
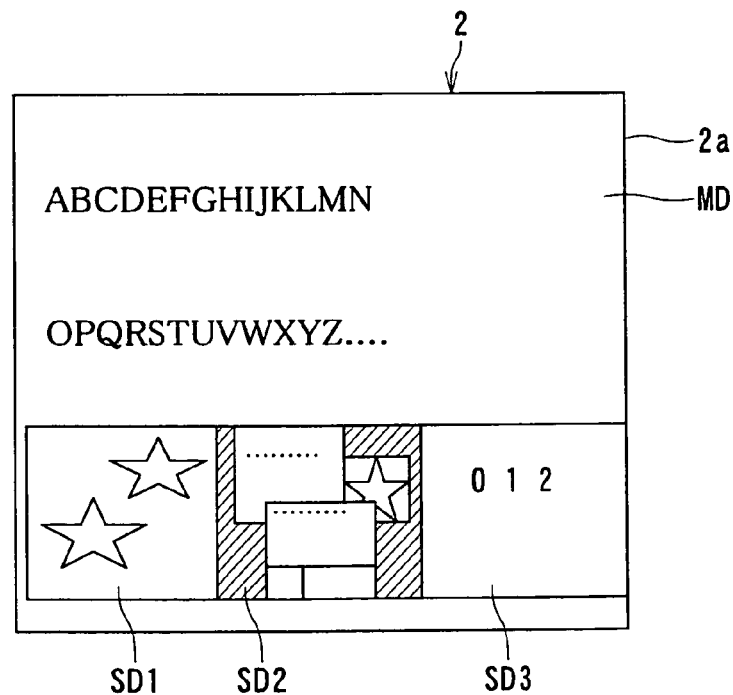
FIG. 8 is a diagram illustrating a screen example to be displayed on the operating-side display unit of the cellular phone in the event that one of view regions is taken as the entire screen to be displayed on the operated-side display unit of the PC illustrated in FIG. 1.

FIG. 8 is a diagram illustrating a screen example to be displayed on the operating-side display unit 2*a* of the cellular phone 2 in the event that one of view regions is taken as the entire screen to be displayed on the operated-side display unit 3*a* of the PC 3 illustrated in FIG. 1. As illustrated in FIG. 8, one of the view regions may be taken as a view region referred to as an entire screen view for displaying the entire screen of the operated-side display unit 3*a* of the PC 3. More specifically, the entire screen of the operated-side display unit 3*a* of the PC 3 including the respective windows W1, W2, and W3 is displayed on the sub display region SD2 along with a background. Defining such an entire screen view allows the window arrangement of the entire screen on the operated-side display unit 3*a* of the PC 3 to be recognized easily.

The assigned window of the entire screen view can be defined as all windows, or may be defined without correlating with any window. Alternatively, in the same way as normal view regions other than the entire screen view, the assigned window of the entire screen view may be correlated with a single window, and defined such that the region range of a view region becomes the region range equivalent to the entire screen of the operated-side display unit 3*a* of the PC 3.

As described above, an image displayed on the operated-side display unit 3*a* of the PC 3 is divided and displayed on the operating-side display unit 2*a* of the cellular phone 2 as the image of each view region, and accordingly, the user can reduce the number of operations such as scrolling or positional movement of a screen, and can easily recognize an image displayed on the operated-side display unit 3*a* of the PC 3.

Next, in S3, a window (application) to be operated is selected, for example. Hereinafter, a window to be operated currently will be referred to as the active window, and a view region of which the assigned window is the active window will be referred to as the active view region. The active window is normally displayed in the foreground at the operated-side display unit 3*a* of the PC 3, and the active view region is displayed on the main display region MD at the operating-side display unit 2*a* of the cellular phone 2 for example. Accordingly, in the event that there are multiple view regions, each of which the assigned window is the active window, part or all of images to be displayed on the sub display regions SD1, SD2, and SD3 becomes the active view region.

The active window can be switched by operating the operating unit 10 of the cellular phone 2. More specifically, in the event of switching the active window, the user inputs active window switching information from the operating unit 10 to the control information processing unit 11. For example, active window switching information can be input to the control information processing unit 11 from the operating unit 10 by directly inputting the identification number of a view region, or selecting the sub display regions SD1, SD2, or SD3. Alternatively, the same information at the time of operating Alt key+TAB key of the PC 3 from the operating unit 10 of the cellular phone 2 may be input to the control information processing unit 11 as active window switching information.

Next, in S4, the control information processing unit 11 acquires view information from the view region storing unit 16 when receiving active window switching information. In the event that the view region of the 1st display priority of which the assigned window is not a window to become the active window, the control information processing unit 11 executes processing for changing the display priorities of view regions and updates the view information of the view region storing unit 16.

FIG. 9 is a table showing new view information yielded by updating the display priorities of the view information shown in FIG. 4 in the event of change in the active window. As illustrated in FIG. 9, each time the active window is changed, the display priorities of view regions are updated. More specifically, the window W2 is the active window at DISPLAY PRIORITY (1), and is 1st in display priority, and accordingly, the view region V2 of which the assigned window is the window W2 is displayed on the main display region MD.

In the event that a change is made from this state such that the view region V3 displayed on the sub display region SD1 is to be the active view region which is operated, the display priorities are changed as shown in DISPLAY PRIORITY (2). More specifically, the display priority of the view region V3 becomes the 1st priority, and the display priorities of the other view regions V4 and V5 belonging to the window W3 serving as the assigned window of the view region V3 are increased according to change in the display priority of the view region V3.

In addition, in the event that the view region V4 displayed on the sub display region SD1 is changed as the active view region to be operated from this state, the display priorities are changed as shown in DISPLAY PRIORITY (3). More specifically, since the active window is not changed in this case, the display priorities of the view regions V3 and V5 belonging to the window W3 are set to higher priorities.

As described above, multiple regions of a window to be operated at the cellular phone 2 can be displayed on the operating-side display unit 2*a* at the same time by the display priorities of the multiple view regions V3, V4, and V5 defined as separate regions in the common window being changed at the same time, i.e., being changed following each other.

Figure 10:
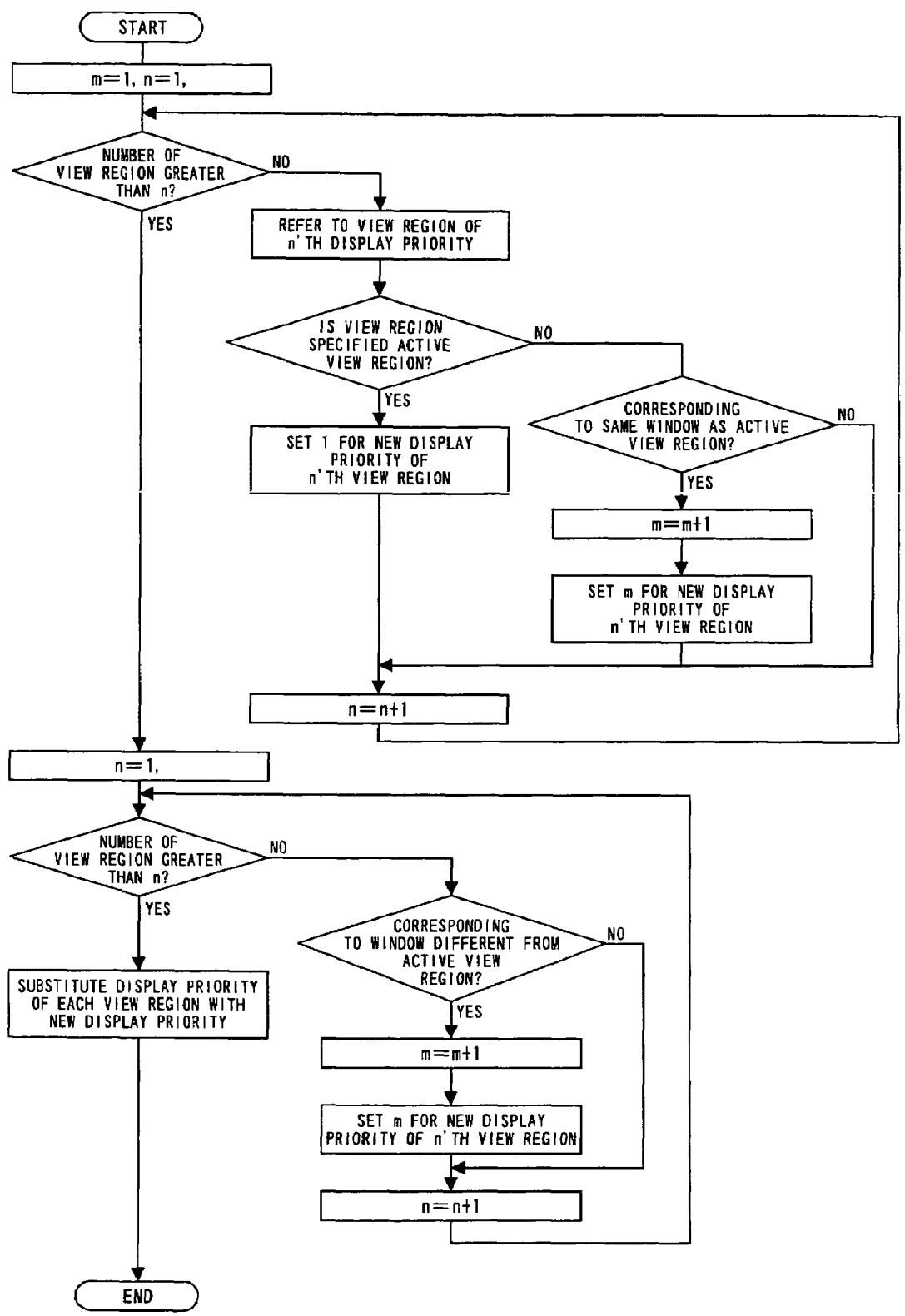
FIG. 10 is a flowchart illustrating a information processing procedures example at the time of setting the display priority of the window in the view information illustrated in FIG. 4 according to change in the active window.

FIG. 10 is a flowchart illustrating a information processing procedures example at the time of setting the display priority of the window in the view information illustrated in FIG. 4 according to change in the active window.

The control information processing unit 11 sets, for example, the display priority of a new window in accordance with the algorithm illustrated in FIG. 10 when receiving the active window switching information from the operating unit 10. Upon receiving the active window switching information, the control information processing unit 11 refers to view information in order of the display priorities, sets the display priority of the view region specified as the active view region to the 1st priority, sets the view regions belonging to the same window as the view region specified as the active view region to higher display priorities, and sets the other view regions to lower display priorities.

An arrangement may be made wherein multiple windows are correlated with each other as well as the view regions belonging to the same window as described above, the display priorities of the view regions of which the assigned windows are the correlated other windows are set so as to be higher priorities when the assigned window of a certain window becomes the active window.

Thus, in the event that there is the need to refer and operate multiple windows at the same time, the view region of each window can be displayed on the main display region or sub display region respectively with fewer operating steps. Note that the specific information of windows correlated with the assigned window is added to the view information as parameters in this case, and employed at the time of setting display priorities by the control information processing unit 11.

Next, in S5, the new display priorities of the view regions are transmitted from the cellular phone 2 to the PC 3. More specifically, the control information processing unit 11 of the cellular phone 2 provides the new display priorities of the view regions to the communication unit 12, and the communication unit 12 of the cellular phone 2 transmits the new display priorities of the view regions to the communication unit 17 of the PC 3 via the network.

Next, in S6, the communication unit 17 of the PC 3 provides the new display priorities of the view regions to the control information processing unit 21 of the PC 3. The control information processing unit 21 updates the view information of the view region storing unit 20 based on the new display priorities of the view regions, and provides window display priority information to the Operating System 22 so as to change the active window at the PC 3 side.

Next, in S7, the screen information processing unit 18 of the PC 3 acquires the image information displayed, after change in the active window, on the operated-side display unit 3a of the PC 3 from the VRAM 25 via the pseudo driver 23. The screen information processing unit 18 provides the acquired image information to the image compression unit 19 so as to generate the compressed image information after change in the active window.

Next, in S8, the compressed image after change in the active window is transmitted from the screen information processing unit 18 of the PC 3 to the screen information processing unit 13 of the cellular phone 2 via the communication unit 17 of the PC 3, and the communication unit 12 of the cellular phone 2.

Next, in S9, the screen information processing unit 13 of the cellular phone 2 provides the compressed image after change in the active window to the image developing unit 14 so as to execute development processing, and the obtained image after change in the active window is displayed on the operating-side display unit 2a in accordance with the display priorities of view regions stored in the view region storing unit 16. In other words, the screen information processing unit 13 refers to new view information read therein from the view region storing unit 16 following update, and provides the image information corresponding to the view region having the 1st display priority to the operating-side display unit 2a so as to display this information on the main display region MD.

Note that upon the active window being thus selected, the view region of which the assigned window is the active window is displayed on the main display region MD, and is displayed on the sub display region as well. In the event that the view region to be operated belonging to the active window is selected, switching of the active window is not performed, and the display region is changed from the sub display region to the main display region MD.

Even in the event that the active window is changed by operations at the PC 3 side, the control information processing unit 21 of the PC 3 side performs resetting processing of display priorities, and the new display priorities of the view regions are transmitted to the control information processing unit 11 via the communication unit 17 of the PC 3 and the communication unit 12 of the cellular phone 2. Subsequently, the active view region to be displayed on the operating-side display unit 2a of the cellular phone 2 side is changed. In other words, the active window is mutually synchronized between the PC 3 and the cellular phone 2, and the other operating information is also synchronized between both as necessary.

As described above, upon the active window to be operated and the active view region being selected, the user can remote-operate various types of applications activated via a window at the PC 3 from the operating unit 10 of the cellular phone 2. Alternatively, various types of operations such as change of the display format of the operating-side display unit 2a of the cellular phone 2 may be performed prior to remote-operating various types of applications.

In general, small-sized information equipment such as the cellular phone 2 includes no input device such as a mouse unlike normal information equipment such as the PC 3, and also restricts the number of buttons. Accordingly, even with the operating unit 10 in which the number of buttons is restricted like the cellular phone 2, the control information processing unit 11 of the cellular phone 2 includes a function for allowing the same information input as an input device such as a keyboard or mouse at the PC 3.

Figure 11:
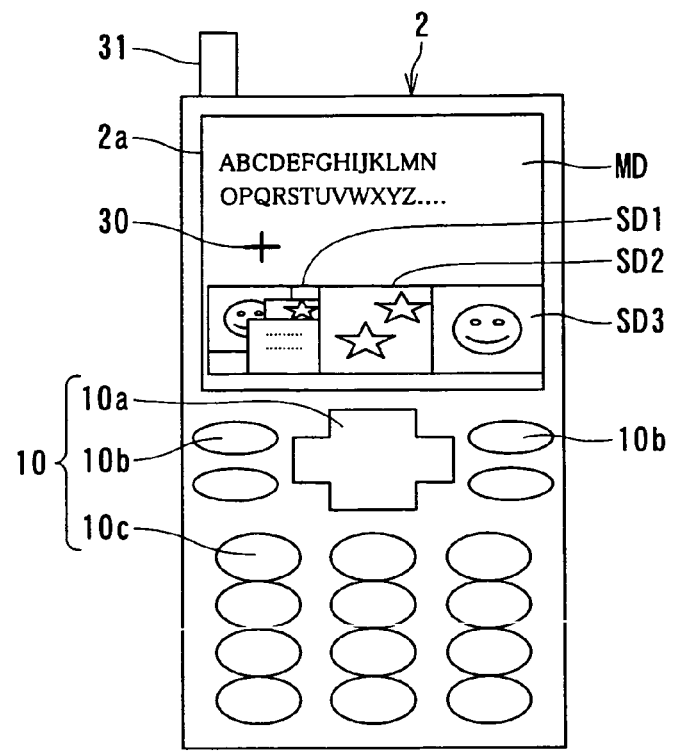
FIG. 11 is a diagram illustrating a button arrangement example in the operating unit of the cellular phone illustrated in FIG. 1.

FIG. 11 is a diagram illustrating a button arrangement example in the operating unit 10 of the cellular phone 2 illustrated in FIG. 1. The cellular phone 2 includes the operating unit 10 as well as the operating-side display unit 2a. The operating unit 10 includes an up/down/left/right button 10a serving as a direction instructing key, a function button 10b serving as a role change key, and a numeric button 10c. Further, the operating-side display unit 2a includes the main display region MD, and the sub display regions SD1, SD2, and SD3, and a cursor 30 is displayed on the main display region MD to be operated. Various types of information such as image information and the operating information of the PC 3 is transmitted/received from an antenna unit 31 by means of radiowaves as to the base station 5.

On the main display region MD, operations such as movement of the cursor 30, movement of an up/down scroll bar and left/right scroll bar on a window of the PC 3, movement of a view region to be displayed on the operating-side display unit 2a of the cellular phone 2 (scrolling), and change in zoom of a view region to be displayed on the operating-side display unit 2a of the cellular phone 2 can be performed as well as text input and operating an application using the numeric button 10c of the operating unit 10.

Of these operations, regarding movement of the cursor 30, movement of an up/down scroll bar and left/right scroll bar on a window of the PC 3, and movement of a view region to be displayed on the operating-side display unit 2a of the cellular phone 2, operations in the vertical and horizontal directions toward the operating-side display unit 2a of the cellular phone 2 are necessary. Regarding change in zoom of a view region, change in one-dimensional values is necessary.

With normal information equipment such as the PC 3, the aforementioned operations can be performed using an input device such as a mouse or track ball. However, in the event that the operating unit 10 has a hardware or software restriction like the cellular phone 2, it is necessary for the operating unit 10 to realize the equivalent function using fewer buttons. Accordingly, an arrangement may be made wherein operations in the vertical and horizontal directions are assigned to the up/down/left/right button 10a or a jog dial, and the type of each movement operation such as movement of the cursor 30, movement of the scroll bar, and movement of a view region can be mode-switched using the function button 10*b* (change in the function of the up/down/left/right button 10*a*). Thus, the user can realize the operations such as movement of the cursor and movement of a scroll bar of the PC 3 by means of fewer button operations by the function switching of the up/down/left/right button 10*a*.

Normally, operations of an application running on the PC 3 are performed as to a view region displayed on the main display region MD, but operations other than application operations such as switching of a view region to be displayed on the main display region MD, and termination of remote operations may be performed. Accordingly, a function switching function for switching between an application operating mode for performing operations on an application and a control mode for performing operations other than applications is assigned to the function button 10*b*. Thus, the user can realize the operations equivalent to the operations of the PC 3 by means of fewer button operations by the function switching by the function button 10*b*.

In addition, an arrangement may be made wherein multiple types of display formats are set to the operating-side display unit 2*a* of the cellular phone 2, which can be switched as a display mode.

Figure 12:
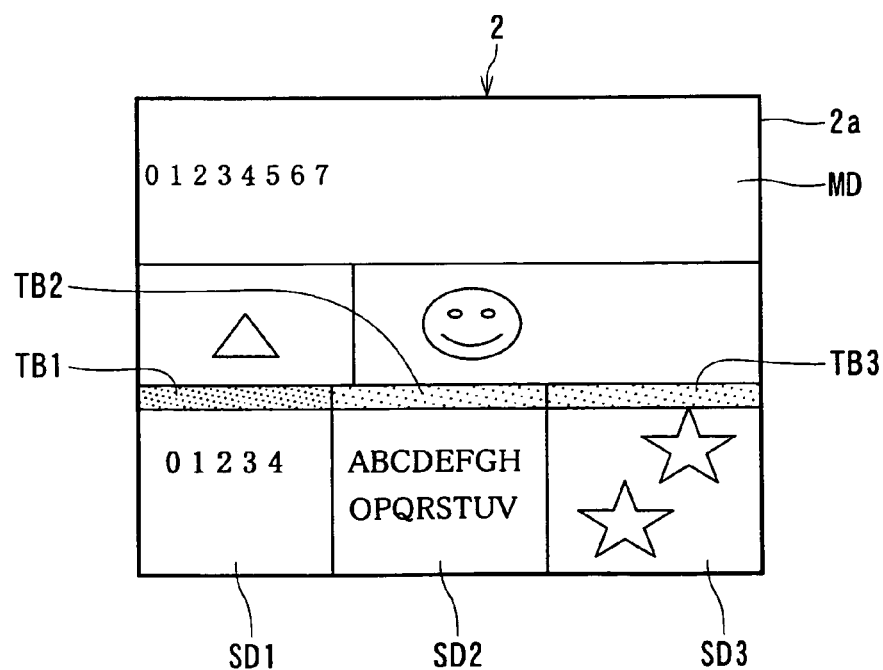
FIG. 12 is a diagram illustrating the display format of a screen in which a title bar is displayed on the operating-side display unit of the cellular phone illustrated in FIG. 1.

FIG. 12 is a diagram illustrating the display format of a screen in which a title bar is displayed on the operating-side display unit 2*a* of the cellular phone 2 illustrated in FIG. 1. As illustrated in FIG. 12, the operating-side display unit 2*a* of the cellular phone 2 includes the main display region MD and three sub display regions SD1, SD2, and SD3. Here, title bars TB1, TB2, and TB3 are added to the respective sub display regions SD1, SD2, and SD3. The title bars TB1, TB2, and TB3 are set so as to clearly indicate whether or not each view region to be displayed on the respective sub display regions SD1, SD2, and SD3 is active by changing the color of each view region. Thus, the active window and active view region to be operated currently can be clearly confirmed and determined.

In other words, the respective title bars TB1, TB2, and TB3 function as an identification display example indicating whether or not the assigned window of the view regions corresponding to each image displayed on the respective sub display regions SD1, SD2, and SD3 of the operating-side display unit 2*a* is the active window to be operated.

In the example illustrated in FIG. 12, the title bars TB1, TB2, and TB3 are employed as an identification display indicating whether or not the view region is active, but an arbitrary display method can be employed as long as whether or not each sub display region such as the color of the border of each sub display region is active can be identified. In addition, an arrangement may be made wherein a title bar is added to the main display region corresponding to the active window, and the same color as the sub display region is added thereto, and thus, whether or not the main display region and the sub display region correspond to the same window can be understood intuitively.

In addition, an arrangement may be made wherein title bars TB1, TB2, and TB3 are set so as to have a different color for each corresponding window, and thus, of the multiple main display region and sub display regions, whether which display region of which the view region corresponds to which window can be understood intuitively.

Color control of the title bars TB1, TB2, and TB3 is performed wherein the screen information processing unit 13 acquires view information from the view region storing unit 16, and determines whether or not the assigned window of the view region displayed on each sub display region is the active view window, i.e., whether or not the display priority of the view information is 1st in priority, and the color information of the title bars TB1, TB2, and TB3 is provided to the operating-side display unit 2*a* according to the determination results.

FIGS. 13A1 through 13B2 are diagrams illustrating the display format of a screen in which a scroll bar is displayed on the operating-side display unit 2*a* of the cellular phone 2 illustrated in FIG. 1, FIG. 14 is a table showing a color example to be used for coloring of the scroll bar illustrated in FIGS. 13A1 through 13B2, and FIG. 15 is a table showing a setting reference example of colors to be used for coloring of the scroll bar shown in FIG. 14.

As illustrated in FIGS. 13A1 through 13B2, an arrangement may be made wherein a scroll bar is displayed on the operating-side display unit 2*a* of the cellular phone 2, resulting in improving user convenience. FIGS. 13A1 and 13B1 illustrate screen examples to be displayed on the operated-side display unit 3*a* of the PC 3, and FIGS. 13A2 and 13B2 illustrate screen examples to be displayed on the operating-side display unit 2*a* of the cellular phone 2 at that time.

In the event that a certain window region is set as the active view region, and the other regions are set as the non-active view regions, as illustrated in FIGS. 13A1 and 13B1, the view regions having a high display priority of the respective view regions are displayed on the operating-side display unit 2*a* of the cellular phone 2, as illustrated in FIGS. 13A2 and 13B2. More specifically, the main display region MD and the multiple sub display regions SD1, SD2, and SD3 are provided on the operating-side display unit 2*a* of the cellular phone 2, a part of the active view region of which the display priority is 1st priority is displayed on the main display region MD, and each part of the view regions of which the display priorities are the 2nd, 3rd, and 4th priorities is displayed on the sub display regions SD1, SD2, and SD3.

In addition, scroll bars (up/down scroll bar SB1 and left/right scroll bar SB2) are provided on the main display region MD. These scroll bars are colored with multiple colors so as to indicate the display states of the view region and the active window displayed on the main display region MD by their colors.

Colors employed in coloration of the scroll bars are, for example, four colors: color 1 (C1), color 2 (C2), color 3 (C3), and color 4 (C4) as shown in FIG. 14, and white, blue, red, and purple are assigned to the color 1, color 2, color 3, and color 4 respectively. The respective colors 1 through 4 of the scroll bar are correlated with the display states of the view region and the active window respectively in accordance with the setting reference such as shown in FIG. 15. More specifically, for example, the color 1 of the scroll bar color indicates the region outside the active window and the range not displayed on the main display region MD, of the operated-side display unit 3*a*, the color 2 indicates the region inside the active window but not the range displayed on the main display region MD, the color 3 indicates the region outside the active window and also the range displayed on the main display region MD of the operated-side display unit 3*a*, and the color 4 indicates the region inside the active window and also the range displayed on the main display region MD respectively.

Accordingly, in the event that the view region of which the assigned window is the active window is set so as to become inside the active window as illustrated in FIG. 13A1, the view region inside the active window is displayed on the main display region MD, so the color of the scroll bar is colored with the color 1, color 2, and color 4.

On the other hand, in the event that the view region of which the assigned window is the active window is set so as to be outside of the active window as illustrated in FIG. 13B1, the view region made up of a part of the active window and the region outside the active window is displayed on the main display region MD, so the color of the scroll bar is colored with the color 1, color 2, color 3, and color 4.

That is to say, the scroll bar functions as positional display indicating relative positional relations between the operated-side display unit 3a, the active window, and the main display region MD of the operating-side display unit 2a.

In the event of controlling the color of the scroll bar, the screen information processing unit 18 of the PC 3 transmits information regarding the entire size of the operated-side display unit 3a of the PC 3 and the position and size of the active window as well at the time of transmitting image information to the screen information processing unit 13 of the cellular phone 2 via the communication unit 17. The screen information processing unit 13 of the cellular phone 2 determines the color of the scroll bar based on the information regarding the entire size of the operated-side display unit 3a of the PC 3 and the position and size of the active window, and provides the color of the scroll bar to the operating-side display unit 2a so as to display this.

Note that the color of the scroll bar may be defined with any color, but defining the color with a mixed color of the color 4, color 2, and color 3 facilitates the user to recognize the positional relations between a view region and the active window intuitively.

Thus, the user can determine what kind of positional relations the range currently displayed on the operating-side display unit 2a has as to the entire screen of the operated-side display unit 3a and the active window at a glance due to the color display of the scroll bar.

FIGS. 16A and 16B are diagrams illustrating an example in which the display format of the operating-side display unit 2a of the cellular phone 2 illustrated in FIG. 1 is switched according to the angle of the operating-side display unit 2a.

FIG. 16A illustrates the display format of a screen to be displayed on the operating-side display unit 2a in the event that the user directs the operating-side display unit 2a in the vertical direction as to the cellular phone main unit 2b, and FIG. 16B illustrates the display format of a screen to be displayed on the operating-side display unit 2a in the event that the user directs the operating-side display unit 2a in the horizontal direction as to the cellular phone main unit 2b.

As illustrated in FIG. 16A, in the event that the user directs the operating-side display unit 2a in the vertical direction as to the cellular phone main unit 2b, the screen of the operating-side display unit 2a is divided into a main display region MD and a sub display region SD. On the main display region MD, the entire screen view for displaying the same entire screen as FIG. 8 is displayed, and on the sub display region SD, the view region 1st in display priority is displayed.

On the other hand, in the event of the cellular phone 2 having a function for inclining the angle of the operating-side display unit 2a, the operating-side display unit 2a can be directed in the horizontal direction as to the cellular phone main unit 2b (rotate the operating-side display unit 2a by 90 degree), as illustrated in FIG. 16B. In the event that the user directs the operating-side display unit 2a in the horizontal direction as to the cellular phone main unit 2b, the display unit angle detection unit 15 detects that the operating-side display unit 2a directs in the horizontal direction as to the cellular phone main unit 2b, and provides the detection results to the screen information processing unit 13 as display unit angle information.

When the screen information processing unit 13 receives from the display unit angle detection unit 15 display unit angle information to the effect that the operating-side display unit 2a is in the horizontal direction as to the cellular phone main unit 2b, the screen information processing unit 13 switches the display format, generates image information, and provides the image information to the operating-side display unit 2a so as to display the image. Consequently, for example, as illustrated in FIG. 16B, only the entire screen view is displayed on the main display region MD while following the direction of the operating-side display unit 2a in the horizontal direction.

In the same way, even in the event that the operating-side display unit 2a is inclined in the vertical direction from the state in which the operating-side display unit 2a is in the horizontal direction as to the cellular phone main unit 2b, the display unit angle detection unit 15 detects that the operating-side display unit 2a is in the vertical direction as to the cellular phone main unit 2b, and provides display unit angle information to the screen information processing unit 13. The screen information processing unit 13 switches the display format, generates image information, and provides the image information to the operating-side display unit 2a so as to display the divided main display region MD and sub display region SD as illustrated in FIG. 16A.

Thus, a vertically divided display mode and a horizontally undivided display mode may be automatically switched for display according to the direction of the operating-side display unit 2a. Accordingly, the user can employ the screen of the operating-side display unit 2a of the cellular phone 2 to the maximum in the event of performing more meticulous operations. Further, display may be automatically switched to the entire view by rotating the operating-side display unit 2a.

As described above, an arrangement may be made wherein display on the operating-side display unit 2a with various types of a display format can be set, and the display mode can be switched by one-touch control using the function button 10b of the cellular phone 2 as one means for changing various types of mode.

In addition to display formats, an arrangement may be made wherein, with regard to the sub display region where the image of the view region of which the present assigned window is not the active window is displayed, the image display is unchanged even if the active window is changed, i.e., the image display when the assigned window was the active window the last time can be maintained.

In other words, following an image being updated so as to change the assigned window of a certain view region to the active window, upon the active window being changed to another window, the image of the view region of which the assigned window is the new active window is displayed in the foreground, the image of the view region edited in the past hides behind the image of the view region of which the assigned window is the new active window, and accordingly, the user may overlook the image of the view region edited in the past.

Consequently, continuously displaying such an image of the view region of which the assigned window was the active window the last time without any change allows the image to be displayed in the foreground all the time even if the active window is changed to another window, and allows the user to reference the image on the operating-side display unit 2a.

In this case, the screen display processing unit 13 can include a function for performing such actions. More specifically, in the even that the screen display processing unit 13 references the view information stored in the view region storing unit 16, and the view region displayed on the sub display region of which the assigned window is not the active window, the screen display processing unit 13 prevents the image displayed on the sub display region from updating.

Now, in the event that a large number of view regions exist, the view regions having a low display priority are not displayed on the operating-side display unit 2a. Accordingly, there is the case in which it is convenient for the user to edit the display priorities of view regions manually by mean of button operations of the cellular phone 2, such as the case in which the user wants to display on the main display region or sub display region a view region having too low a display priority to be displayed on the operating-side display unit 2a, by increasing the display priority.

Consequently, the buttons of the cellular phone 2 can include a function for editing the display priority of a view region. Thus, in the event that the user wants to reference a view region of which the assigned window is not the active window, the user can display the view region belonging to the target window on the sub display region without changing the active window. Note that such a function can be included in the control information processing unit 11.

FIG. 17 is a table showing an example for assigning a function to the function button 10b in the operating unit 10 of the cellular phone 2 illustrated in FIG. 1. As illustrated in FIG. 17, for example, in the event of depressing a function button FB1, the mode change referred to as the function change of the up/down/left/right button 10a is performed. In the event of depressing a function button FB2, the operating mode is set so as to change the control mode to the application operating mode, or vice versa. In addition, in the event that the function button FB2 is depressed for a long period (a predetermined period or more), the display mode, i.e., the vertically divided entire screen mode and normal display mode can be switched. Furthermore, functions of display/non-display switching of a scroll bar or display/non-display switching of a title bar on the operating-side display unit 2a may be assigned to the function button 10b.

The aforementioned switching is performed at the control information processing unit 11. More specifically, whenever the control information processing unit 11 receives operating information from the operating unit 10 by the user operating the numeric buttons 10c, function button 10b, or up/down/left/right button 10a, the control information processing unit 11 updates and stores various types of mode such as the function mode of the current up/down/left/right button 10a. Following the mode being determined once, when the control information processing unit 11 receives operating information from the numeric buttons 10c or up/down/left/down button 10a other than the function button 10b, the control information processing unit 11 provides the operating information of an application, the scroll instructions of an image, or the like to the screen information processing unit 13 so as to update display on the operating-side display unit 2a. In the event of operating information of an application, the control information processing unit 11 provides this information to the communication unit 12 so as to transmit this information to the communication unit 17 of the PC 3 side via the network.

In S10 in FIG. 6, for example, under the control mode for performing operations other than applications, the operating unit 10 receives operating information such as a movement command for an image to be displayed on the main display region or sub display region on the cellular phone 2.

Next, in S11, the operating unit 10 provides the operating information to the control information processing unit 11. In the event that the operating information is for redisplaying the screen, the control information processing unit 11 notifies the screen information processing unit 13 of a redisplay command based on the operating information. The screen information processing unit 13 generates predetermined image information based on the redisplay command, and provides the image information to the operating-side display unit 2a so as to display the image.

Note that at this time, in the event that the image of the region not displayed on the main display region or sub display region is displayed, and also in the event that the corresponding image information has not been received yet from the PC 3, a request to transmit the image information is transmitted to the PC 3, and the image information is received from the PC 3 and displayed. Conversely, in the event that the image information necessary for redisplay of the image is stored in the cellular phone 2 side, such as in the event that the image information equivalent to the entire screen view has been received, a request to transmit the image information as to the PC 3 is unnecessary.

In S12, for example, under the application mode for performing remote operations of an application, the operating unit 10 of the cellular phone 2 receives operating information such as movement of the cursor 30, or text input in the active window as application operating information.

Consequently, in S13, the operating unit 10 provides the application operating information to the control information processing unit 11, and the application operating information is provided to the control information processing unit 21 of the PC 3 via the communication unit 12 of the cellular phone 2, and the communication unit 17 of the PC 3.

Next, in S14, the control information processing unit 21 of the PC 3 provides the application operating information to the Operating System 22 so as to execute an application operation. Consequently, an image following an application operation, for example, following movement of the cursor is displayed on the active window.

Next, in S15, the screen information processing unit 18 of the PC 3 acquires the image following an application operation corresponding to the view region belonging to the active window via the pseudo driver 23, and provides the image to the screen compression unit 19 so as to execute compression processing. Thus, a compressed image following an application operation is generated.

Next, in S16, the screen information processing unit 18 of the PC 3 transmits the compressed image following an application operation to the screen information processing unit 13 of the cellular phone 2.

In S17, in the same way as S9, the image following an application operation is displayed on the operating-side display unit 2a of the cellular phone 2.

That is to say, the above-described information equipment remote operating system 1 is a system for operating information equipment having a display device capable of multiple window display such as the PC 3 from information equipment such as a small-sized information terminal connected to the information equipment via the network, and the display region of the operating-side display unit 2a is set based on the window to be displayed on the operated-side display unit 3a.

Thus, according to the information equipment remote operating system 1, in the event of operating the information equipment to be operated with reference to the operating-side display unit 2a of the information equipment such as the cellular phone 2, an image to be displayed on the operating-side display unit 2a can be easily switched for each window in the operated-side display unit 3a. In other words, the window of the information equipment to be operated can be easily changed by simple operations of the information equipment such as the cellular phone 2.

Further, in the event that setting multiple display ranges as to one window as view regions for the operating-side display unit 2a allows the user to reference multiple portions within the same window at the same time when a large window is displayed on the operating-side display unit 2a.

In addition, even in the event that a window is moved by operating the information equipment such as the operated-side PC 3 or the small-sized information terminal such as the cellular phone 2, the region of an image to be displayed on the operating-side display unit 2a is set as a region relative to the reference position of the window, and accordingly, redisplay can be performed without shifting the display range on the operating-side display unit 2a.

Further, a state wherein the objects to be operated of the cellular phone 2 and the PC 3 are matched can be maintained all the time by synchronizing the active windows on the cellular phone 2 and the PC 3.

Furthermore, setting a view region to the entire screen view for displaying the entire screen of the operated-side display unit 3a allows the user to work with reference to the state of the entire screen of the PC 3.

What is claimed is:

1. An information equipment remote operating system comprising:
   an operated-side information equipment for displaying windows on an operated-side display unit and executing an application; and
   an operating-side information equipment, connectable to the operated-side information equipment via a network, having an operating-side display unit smaller than the operated-side display unit,
   wherein the operated-side information equipment includes:
      a view region storing unit configured to store a view information having display priority as parameters at the time of displaying images on one or more display regions assigned in the operating-side display unit, assigned windows correlated to multiple view regions, wherein the number of view regions is greater than the number of display regions, each view region correlated to each window displayed on the operated-side display unit, the view region which is the range of an image in the case of displaying at least a part of the range of a screen displayed on the operated-side display unit, on the operating-side display unit as an initial state, and a relative region range from an arbitrary reference position of the assigned window as parameters;
      a screen information processing unit configured to generate an image to be displayed on the operating-side display unit as an initial state in accordance with the view information;
      a communication unit configured to the view information to the operating-side information equipment along with an image generated by this screen information processing unit, and configured to receive the application operating information from the operating-side information equipment; and
      a control information processing unit configured to operate the application by giving the application operating information received by this communication unit to an operating system, and
   the operating-side information equipment includes:
      a communication unit configured to receive the image transmitted from the operated-side information equipment and the view information;
      a view region storing unit configured to store the view information received by this communication unit;
      a screen information processing unit configured to select the one or more display regions from the multiple view regions generated from an image received by the communication unit according to the display priority in accordance with the view information stored in the view region storing unit and display the selected images on the one or more display regions assigned in the operating-side display unit; and
      a control information processing unit configured to give the application operating information input to the communication unit, and configured to control the operated-side information equipment to transmit the information.

2. An operated-side information equipment for displaying windows on an operated-side display unit and executing an application, connectable via a network, to an operating-side information equipment having an operating-side display unit smaller than the operated-side display unit, comprising:
   a view region storing unit configured to store view information having display priority as parameters at the time of displaying images on one or more display regions assigned in the operating-side display unit, assigned windows correlated to multiple view regions, wherein the number of view regions is greater than the number of display regions, each view region correlated to each window displayed on the operated-side display unit, the view region which is the range of an image in the case of displaying at least a part of the range of a screen displayed on the operated-side display unit, on the operating-side display unit as an initial state, and a relative region range from an arbitrary reference position of the assigned window as parameters;
   a screen information processing unit configured to generate an image to be displayed on the operating-side display unit as an initial state in accordance with the view information;
   a communication unit configured to the view information to the operating-side information equipment along with an image generated by this screen information processing unit, and configured to receive the application operating information from the operating-side information equipment; and
   a control information processing unit configured to operate the application by giving the application operating information received by this communication unit to an operating system.

3. An operating-side information equipment for remotely controlling, via network, an operated-side information equipment which displays windows on an operated-side display unit and executing an application, comprising:
   an operating-side display unit being smaller than that of the operated-side display unit;
   a communication unit configured to receive an image generated and transmitted in the operating-side information equipment in accordance with view information having display priority as parameters at the time of displaying images on one or more display regions assigned in the operating-side display unit, assigned windows correlated to multiple view regions, wherein the number of view regions is greater than the number of display regions, each view region correlated to each window displayed on the operated-side display unit, the view region which is the range of an image in the case of displaying at least a part of the range of a screen displayed on the operated-side display unit, on the operating-side display unit as an initial state, and a relative region range from an arbitrary reference position of the assigned window as parameters;

a view region storing unit configured to store the view information received by the communication unit;

a screen information processing unit configured to select the one or more display regions from the multiple new region generated from an image received by the communication unit according to the display priority in accordance with the view information stored in the view region storing unit and display the selected images on the one or more display regions assigned in the operating-side display unit; and a control information processing unit configured to give the application operating information input to the communication unit, and configured to control the operated-side information equipment to transmit the information.

4. The system according to claim 1, wherein at least one of said screen information processing unit to be provided in the operating-side information equipment and said screen information processing unit to be provided in the operated-side information equipment includes a function for modifying the view region display priority, each of which follows and modifies the display priority of the view regions of which the assigned window is common to each screen information processing unit in a mutual manner.

5. The system according to claim 1, wherein at least one of said screen information processing unit to be provided in the operating-side information equipment and said screen information processing unit to be provided in the operated-side information equipment includes a function for modifying the view region display priority, each of which follows and modifies the display priority of the view region with which the assigned window is correlated in a mutual manner.

6. The system according to claim 1, wherein said view information includes information regarding an entire screen view for displaying the entire screen of the operated-side display unit.

7. The system according to claim 1, wherein said control information processing unit to be provided in the operated-side information equipment includes a function for giving instructions for changing the window to be operated to the operating system such that in response to the selection information of a view region to be operated from the operating-side information equipment, and in the event that the assigned window of the view region to be operated does not agree with the window to be operated in the operated-side information equipment, the window to be operated becomes the assigned window of the view region.

8. The system according to claim 1, wherein said screen display processing unit to be provided in the operating-side information equipment includes a function in which in the event that the assigned window of the view region corresponding to the image displayed on the display region of the operating-side display unit is not the window to be operated, the image operated the last time is continuously displayed without updating screen display.

9. The system according to claim 1, wherein said control information processing unit to be provided in the operating-side information equipment includes a function for changing the display priority of the view information stored in the view region storing unit.

10. The system according to claim 1, wherein said screen display processing unit to be provided in the operating-side information equipment includes a function for controlling the operating-side display unit to display identification display indicating whether or not the assigned window of the respective view regions corresponding to an image displayed on each display region of the operating-side display unit is the window to be operated.

11. The system according to claim 1, wherein said screen display processing unit to be provided in the operating-side information equipment includes a function for controlling the operating-side display unit to display positional display indicating relative positional relations between the operated-side display unit, the window to be operated, and the display region of the operating-side display unit.

12. The system according to claim 1, wherein said operating-side information equipment includes a display unit angle detection unit for detecting that the orientation of the operating-side display unit has been changed, and giving display unit angle information to the screen information processing unit in the operating-side information equipment, and the screen information processing unit of the operating-side information equipment changes the display format of the operating-side display unit based on the display unit angle information received from the display unit angle detection unit.

13. The system according to claim 1, wherein said operating-side information equipment is provided with a direction instructing key and a role changing key, and at least two operations of:

a movement operation of a cursor displayed on the display region of the operating-side display unit by the direction instructing key;

a movement operation of the image displayed on the display region of the operating-side display unit; and a modification operation of display zoom of the image to be displayed on the display region of the operating-side display unit, are switched by the role changing key so as to be executed.

14. The system according to claim 1, wherein said operating-side information equipment is provided with a role changing key, and the application operating information input to the operating unit of the operating-side information equipment is given to the communication unit so as to cause the operated-side information equipment to transmit the information, whereby an application operating mode for performing operations on the application and a control mode for performing operations other than the application are switched by the role changing key.

* * * * *